No. 609,868. Patented Aug. 30, 1898.
C. H. BAYLEY.
LEATHER SKIVING MACHINE.
(Application filed July 15, 1895.)
(No Model.) 3 Sheets—Sheet 1.
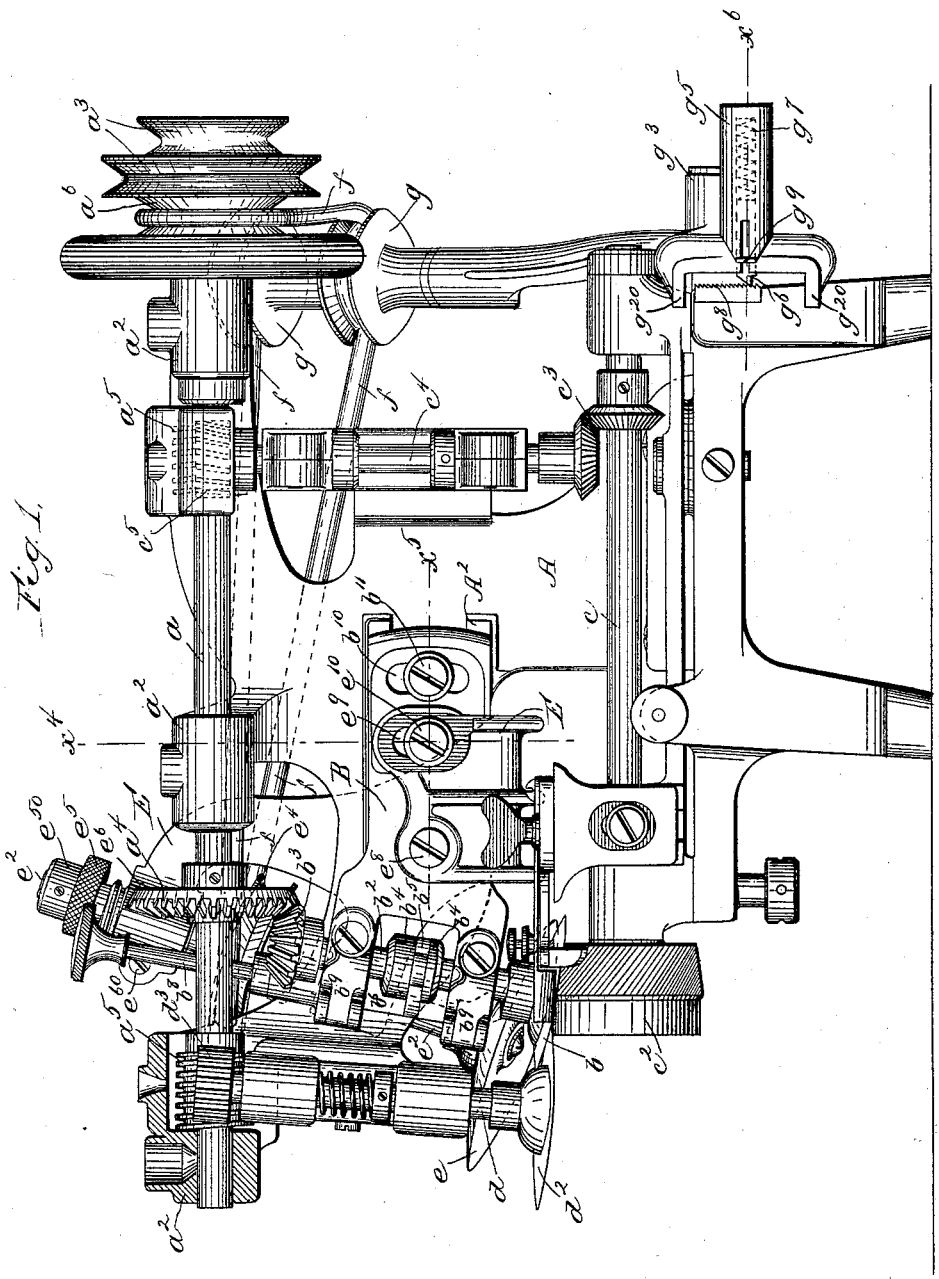
Witnesses
Jas. J. Maloney.
J. J. Livermore.
Inventor,
Charles H. Bayley.
by Jos. P. Livermore
Atty.

No. 609,868. Patented Aug. 30, 1898.
C. H. BAYLEY.
LEATHER SKIVING MACHINE.
(Application filed July 15, 1895.)
(No Model.) 3 Sheets—Sheet 2.
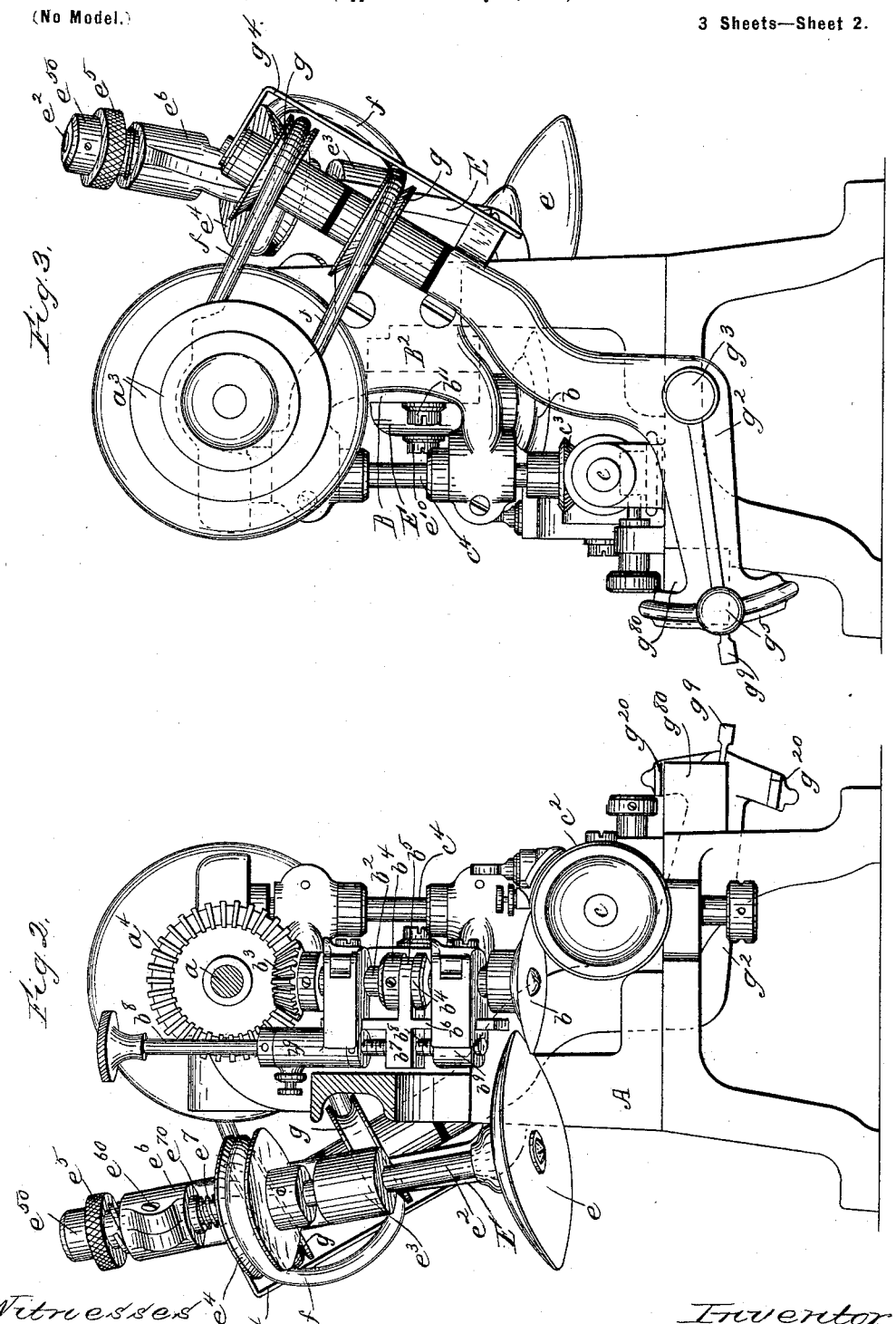
Witnesses
Jas. J. Maloney.
J. H. Livermore.
Inventor,
Charles H. Bayley.
by Jos. P. Livermore
Att'y.
THE NORRIS PETERS CO., PHOTO-LITHO., WASHINGTON, D. C.

No. 609,868. Patented Aug. 30, 1898.
C. H. BAYLEY.
LEATHER SKIVING MACHINE.
(Application filed July 15, 1895.)
(No Model.) 3 Sheets—Sheet 3.
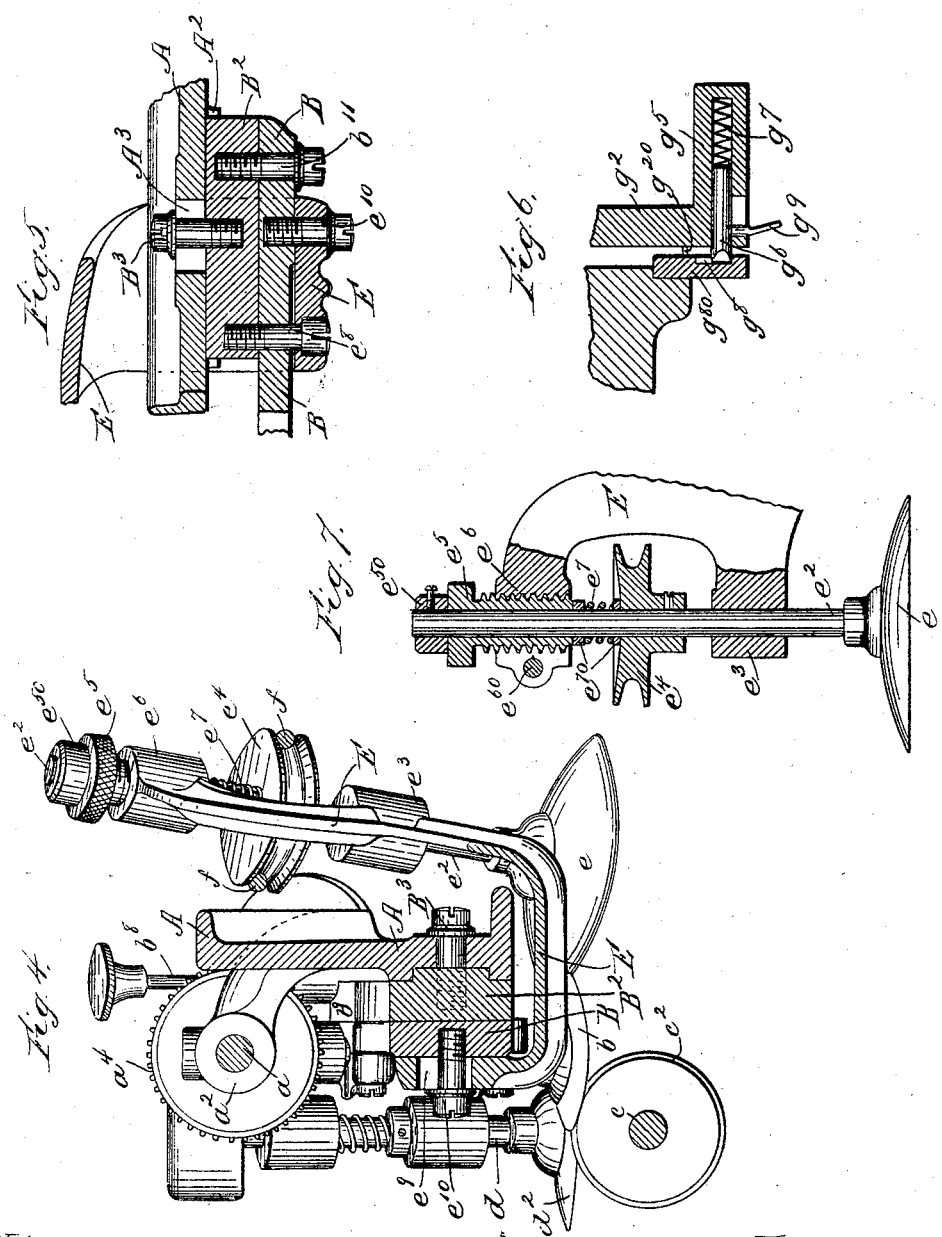

UNITED STATES PATENT OFFICE.

CHARLES H. BAYLEY, OF BOSTON, MASSACHUSETTS, ASSIGNOR TO THE AMAZEEN MACHINE COMPANY, OF PORTLAND, MAINE.

LEATHER-SKIVING MACHINE.

SPECIFICATION forming part of Letters Patent No. 609,868, dated August 30, 1898.

Application filed July 15, 1895. Serial No. 556,004. (No model.)

*To all whom it may concern:*

Be it known that I, CHARLES H. BAYLEY, of Boston, county of Suffolk, State of Massachusetts, have invented an Improvement in Skiving-Machines, of which the following description, in connection with the accompanying drawings, is a specification, like letters on the drawings representing like parts.

The present invention relates to a skiving-machine, and is embodied in a machine of that class in which a rotary disk cutter is employed, set in proper relation to a cutting-bed, so that as a piece of leather is fed toward the rotating cutter a strip will be cut from the edge of the leather, leaving the said edge skived or beveled.

The invention may be and is shown as embodied in a machine the main portion of which is substantially the same as that shown and described in prior patents, Nos. 220,906 and 273,931, granted to C. Amazeen; and the present invention relates, mainly, to a grinder used in combination with the cutter and in the means for adjusting and maintaining the said grinder in proper relation to the cutter and for adjusting the cutter and grinder together with relation to the feed, the cutter having three adjustments, as in Patent No. 273,931, the arrangement thereof, however, being novel and an improvement on that of the prior patent.

Since it is desirable to use the grinder only at intervals, the said grinder is connected to the main shaft by a belt, and a shipper or belt-tightener is provided, whereby the grinder can be effectively connected with the main shaft for actuation or disconnected therefrom, the arrangement being such that the connection is not affected by the changed relative position of the parts due to the adjustment thereof. The frame in which the grinder is mounted is pivotally connected to the cutter-frame, so that the two are relatively movable upon the said pivot to change the angle of the grinder to the cutter, and the two frames may be fastened together in the desired relative position by means of a set-screw or bolt. The two frames thus connected together are so connected with the main frame as to provide for all the adjustments required for the cutter relative to the cutting-bed without disturbing the relation between the cutter and grinder. As herein shown, the cutter-bearing frame (having the grinder-frame fastened to it, as stated) is pivoted to a sliding support longitudinally movable with relation to the frame of the machine and is pivotally adjustable upon the said sliding support to vary its inclination with relation to the cutting-bed, as desired, while said sliding support is also adjustable on the main framework. Thus the cutter and grinder may be adjusted in the proper relation to each other and secured in such relation, while the cutter may afterward be adjusted as desired with relation to the cutting-bed without changing its position relative to that of the grinder.

Figure 1 is a side elevation of a skiving-machine embodying this invention. Fig. 2 is an elevation, partly in section, of the left-hand end of the machine as shown in Fig. 1, with the feed-wheel and a portion of the framework removed. Fig. 3 is an end elevation looking toward the left, Fig. 1. Fig. 4 is a section on line $x^4$, Fig. 1, showing the arrangement of the cutter and grinder frames. Fig. 5 is a sectional detail taken on line $x^5$, Fig. 1, also illustrating the means for adjusting the cutter and grinder frames in accordance with the invention; Fig. 6, a sectional detail on line $x^6$, Fig. 1, showing the construction of the shipping device and the actuator and retaining device therefor; and Fig. 7, a longitudinal section through the axis of the grinder-shaft, showing the said shaft and grinder in elevation.

The machine to which the present invention is applied is in the main similar to the well-known Amazeen skiving-machine shown in the prior patents above mentioned, and has a driving-shaft $a$ mounted in bearings $a^2$ in the main frame A, provided with a suitable supporting-base, said shaft being provided with a driving-pulley $a^3$, through which power is applied. The rotary cutter $b$ is mounted on the end of a shaft $b^2$, having a beveled gear $b^3$, which meshes with a similar gear $a^4$ upon the shaft $a$, so that rotation of the shaft causes the cutter to rotate. The feed mechanism comprises two shafts $c$ and $d$, the former carrying the cylindrical cutting-bed or roll $c^2$ and the latter a disk or feed-wheel $d^2$, so that the material to be skived is engaged between the periphery of the roll $c^2$ and the surface of the disk $d^2$, and thereby fed to the cutter, as shown and described in Patent No. 220,906, above referred to. The shafts $c$ and $d$ are driven by worms $a^5$ on the main shaft $a$, the shaft $d$ being, as shown, directly driven thereby, having itself a worm-gear $d^3$, while the shaft $c$ is connected by beveled gears $c^3$ to a vertical shaft $c^4$, which carries at its upper end the worm-gear $c^5$.

In order that the knife $b$ may be kept sharp without the necessity of its frequent removal from the machine, the grinder $e$ is provided, the said grinder being in accordance with the present invention mounted on a shaft $e^2$, supported in a bearing $e^3$ and provided with a driving-pulley $e^4$, connected by a belt $f$ to a pulley $a^6$ on the main shaft $a$. The grinder $e$ is set, as will be hereinafter described, at the proper angle to the cutter $b$ to grind the edge thereof to the proper bevel, and the shaft $e^2$ is longitudinally movable, so that the grinder can be raised when it is not being used and lowered into engagement with the cutter when the cutter is to be sharpened. This is accomplished by means of a nut or thumb-screw $e^5$, threaded in a portion $e^6$ of the grinder frame or bracket E, containing the bearings for the grinder-shaft, the lower end of said nut engaging, through a cushion or spring $e^7$, with the pulley $e^4$, above described, so that the latter, with the grinder-shaft and grinding-wheel thereon, is capable of yielding upwardly. Washers $e^{70}$ are interposed between the ends of the spring $e^7$ and the nut $e^5$ and pulley $e^4$ to prevent friction at the ends of the spring as the shaft rotates. The shaft has a collar $e^{50}$ at its upper end engaged by the nut to positively lift the shaft, said collar constituting a stop, which limits the extent of the downward movement of the grinder toward the cutter, and the threaded socket, in which the nut works, is split and provided with a clamping-screw, as shown at $e^{60}$, to prevent the nut from turning too freely.

It is necessary to determine the relation of the plane of the grinder to that of the knife with great nicety, so that the edge of the latter may be ground to the proper bevel, and for this reason the inclination of the grinder-shaft is in accordance with the present invention made changeable by suitable adjusting means in the following manner: The grinder frame or bracket E is carried downward, as best shown in Fig. 4, and around below the main frame A and cutter frame or bracket B and provided with an upward extension engaging the face of the said cutter-bracket and secured thereto by a pivot-screw $e^8$. (Best shown in Fig. 5.) As will be seen by reference to Fig. 1, the frame E may be rocked upon the said pivot, thus changing the angle of the grinder-shaft $e^2$ to that of the cutter-shaft $b^2$, so that the knife when engaged by the grinder will be ground at a corresponding bevel. In order to secure the said frame in its proper position with relation to the cutter-frame, a slot $e^9$ is provided, as shown in Fig. 1, and a set-screw $e^{10}$ is provided, passing through said slot and threaded in the cutter-bracket B. Thus when it is desired to adjust the grinder the set-screw $e^{10}$ is loosened, the grinder-frame rocked to the proper position, and the set-screw again tightened.

The means for adjusting the cutter-bracket and cutter with relation to the main frame and cutting-bed are entirely independent of those just described for adjusting the grinder with relation to the cutter, so that the cutter may be adjusted with relation to the cutting-bed without entailing any additional adjustment of the grinder, which still maintains its same relation to the cutters as above described, except in so far as the vertical adjustments of the knife and grinder are concerned, such adjustments, however, not affecting the proper working of the said elements. The vertical adjustment of the cutter is affected by means of a thumb-screw in a manner similar to that described in relation to the grinder, the arrangement, however, being somewhat different, as is necessary owing to the general structure of the machine.

As best shown in Fig. 2, the shaft $b^2$ of the cutter $b$ is provided with two flanges $b^4$, between which is engaged a vertically-movable extension $b^5$ from the slide $b^6$, having a lug $b^7$, through which is threaded a stem $b^8$, adapted to be turned in bearings $b^9$. By turning the said stem, therefore, the thread engaging with the lug $b^7$ will cause the slide $b^6$ to move longitudinally, causing a corresponding vertical movement of the shaft $b^2$. The gearing $b^3$ at the upper end of the said shaft is secured thereto by means of a set-screw or similar device, so that its position may be changed when the cutter-shaft is adjusted in order to keep it properly in mesh with the gear $a^4$ upon the main shaft.

To change the bevel of the cutter for work of different kind or to compensate for wear, due to repeated sharpening, a similar adjustment to that already described in connection with the grinder is provided, the bracket B, containing the bearings for the cutter-shaft, being pivotally secured, preferably as shown, upon the pivot-screw $e^8$, which is the same as that which supports the grinder to a supplemental frame or slide $B^2$, supported in a guide $A^2$ upon the face of the main frame A.

To secure the cutter-bracket B in the proper angular position after it has been brought to such position by rocking it upon the pivot $e^8$, a slot $b^{10}$, Fig. 1, is provided, through which extends a clamping-screw $b^{11}$, screwing into the supplemental slide-frame $B^2$. Thus the angle of the cutter may be changed by loosening the set-screw $b^{11}$, moving the frame B upon its pivot to the proper position, and afterward setting up the said set-screw.

The longitudinal adjustment of the cutter-frame relative to the main frame and cutting bed or roll $c^2$ is effected by moving the supplemental frame $B^2$ longitudinally along the guide $A^2$, the said supplemental frame being secured when adjusted by a set-screw $B^3$, extending through a slot $A^3$ in the main frame A, as is clearly shown in Fig. 5. Thus after the grinder has been adjusted with relation to the cutter the said cutter may receive all necessary adjustments with relation to the work, while the grinder accompanies it and remains at all times in proper operative relation to the cutter to properly sharpen the same when necessary.

The grinder may be actuated in any suitable manner. As herein shown, it is driven from the main shaft by means of a belt $f$, the said belt normally being loose, so that no power is transmitted thereby, but provided with a shipper or belt-tightener comprising supplemental pulleys or idlers $g$, adapted to tighten the belt when it is desired to operate the grinder. It is necessary in order to afford the proper adjustments that the belt should be quite slack, and in order to provide for this without danger of the said belt becoming disengaged from the pulleys, and therefore causing trouble, the driving-pulley $a^6$ upon the main shaft is provided with a deep groove, and the belt extends outward therefrom transversely to the machine around the idler-pulleys $g$ and thence longitudinally to the idler-pulley $e^4$ upon the grinder-shaft. The idlers $g$ are mounted on one arm of a rocking frame or lever $g^2$, pivoted at $g^3$ upon the main frame of the machine, the said arm being provided with a guard $g^4$, extending from one end thereof outward around the peripheries of the pulleys $g$, as clearly shown in Fig. 3, sufficiently near the said pulleys to prevent the belt from escaping from the grooves thereof when slack. In order to retain the said lever in proper position to cause the idlers on the arm thereof to bear against the slack of the belt and tighten the same, so as to cause power to be transmitted, the other arm thereof, which is provided with an operating-handle $g^5$, is also provided with a locking device, preferably a spring latch or pawl $g^6$, (best shown in Figs. 1 and 6,) normally pressed by its spring $g^7$ against a ratchet-surface $g^8$ and having a handle $g^9$, by which it may be disengaged from said ratchet-surface when it is desired to restore the rocker to its normal position.

The handled arm of the belt-tightener is provided with stop projections $g^{20}$ for limiting its movement, said stop projections being best shown in Figs. 1 and 2 and extending laterally across the ends of the part $g^{80}$, containing the ratchet-teeth $g^8$, that coöperate with the latch $g^6$ for the belt-tightener. The said part $g^{80}$ is shown as a ratchet arm or projection extending from the base of the framework between the stop projections $g^{20}$, which are far enough apart to give sufficient range of movement to the belt-tightener to properly tighten or slacken the belt. Normally the belt-tightener rests with the upper projection $g^{20}$ on the upper edge of the ratchet-arm $g^{80}$, in which position the belt $f$ is so slack on its pulleys as not to be driven by the pulley $a^6$ on the main shaft.

When it is desired to grind the cutter, the operator merely raises the handle $g^5$ of the belt-shipper until the pulleys $g$ thereof take up the slack of the belt, which is then driven by the pulley $a^6$ and drives the grinder-shaft pulley $e^4$. In this upward movement of the handle $g^5$ the latch $g^6$ passes along the ratchet and prevents return movement of the shipper, which is thus locked when it arrives at the position where the belt is properly tightened. The operator then lowers the grinder $e$, which, as well as the cutter $b$, is in rapid rotation, until the grinder reaches the cutter and acts to grind the upper surface of the periphery to the proper bevel. The spring $e^7$, interposed between the nut $e^5$ and the grinder-shaft and rendering the grinder somewhat yielding in an upward direction, as before stated, prevents the grinder from acting too harshly on the cutter and damaging the same, as might happen if it were forced down positively by the nut $e^5$ and the latter were carelessly manipulated by the operator. When the cutter is sufficiently ground, the grinder is again raised by turning the nut $e$ upward, and the rotation of the grinder will then be stopped by the operator disengaging the latch $g^6$ from the ratchet $g^8$ by means of the handle $g^9$ and dropping the handled arm of the shipper until its upper stop projection $g^{20}$ rests on the ratchet-arm $g^{80}$ with the belt sufficiently slack to cease to drive. The lower stop projection $g^{20}$ serves to prevent the shipper from falling out of proper position in case the belt should break or be removed from the machine.

In the foregoing description some parts of the machine have been omitted—such, for example, as certain parts of the feeding mechanism—since they have no bearing upon the present invention and have already been described in detail in the prior patents above referred to. So much of the device, however, as embodies the present invention has been fully described and illustrated in a practical form, it not being intended to limit the invention solely to such form, since modifications might be made without departing from the principle involved.

I claim—

1. The combination with a rotary disk cutter and movable bearing bracket or support therefor, of a grinder and grinder-shaft and bearing frame or bracket therefor supported on said cutter-shaft bracket, and means for adjusting the position of the grinder-bracket upon the cutter-bracket, whereby the said grinder may be set in proper position with relation to the cutter and retained therein independently of changes of position of the cutter, substantially as and for the purpose described.

2. In a skiving-machine, the cutter-shaft and bearing frame or bracket therefor, and a slide adjustably connected to the main frame, said cutter-shaft bracket being pivotally connected with said slide and provided with a locking device for fastening it in any desired pivotal adjustment on said slide; a grinder-shaft and bearing frame or bracket therefor pivotally supported on the cutter-shaft frame, and a locking device for fastening said grinder-shaft bracket in the desired pivotal adjustment on said cutter-shaft bracket, substantially as described.

3. The combination with a rotary disk cutter, of a grinder and grinder-shaft; means for moving said grinder-shaft longitudinally; a stop which positively limits the movement of said grinder-shaft and grinder toward the cutter; and a spring whereby said grinder-shaft and grinder are advanced toward the cutter as far as permitted by said stop, substantially as described.

In testimony whereof I have signed my name to this specification in the presence of two subscribing witnesses.

CHARLES H. BAYLEY.

Witnesses:
H. J. LIVERMORE,
M. E. HILL.